Oct. 11, 1960          P. G. SCHWAAR          2,955,747
                    SUPERSONIC AXIAL COMPRESSORS
Filed June 4, 1957                              2 Sheets-Sheet 1

INVENTOR
Pierre G. Schwaar
By
Watson, Cole, Grindle & Watson
ATTORNEYS

United States Patent Office 2,955,747
Patented Oct. 11, 1960

2,955,747

SUPERSONIC AXIAL COMPRESSORS

Pierre Georges Schwaar, Dammarie-les-Lys, France, assignor to Societe Nationale d'Etude et de Construction de Moteurs d'Aviation, Paris, France, a French company Filed June 4, 1957, Ser. No. 663,486

Claims priority, application France June 11, 1956

4 Claims. (Cl. 230—123)

In most supersonic axial compressors, compression of the fluid is effected through frontal or oblique shock waves, in the passages bounded by the stationary or moving vanes of the compressor. Generally speaking, the main difficulty encountered in the construction of a shock wave type compressor of high efficiency is to be found in the detrimental interaction of the boundary layers and of the shock waves used for compression.

The main object of the present invention is to provide a shock wave compressor in which the surfaces exposed to the supersonic flow upstream of the shock waves and the supersonic or subsonic flow immediately on the downstream side of the latter, are reduced to a minimum.

A further object of this invention is to allow a suction or a blowing action to be carried out on the boundary layers.

A still further object of this invention is to avoid the conventional shock-wave generating vanes which constitute, owing to their generally small relative pitch, a large fraction of the exposed surfaces, and in particular, to provide shock wave compression in a purely axial flow, in an annular vaneless space downstream of a ring of moving blades.

It will be appreciated that boundary layer control is easily achieved, since these layers are produced on the stationary walls of the machine.

However, when such a machine is tested, it appears difficult to obtain a high compression ratio (about 2 or more) together with a satisfactory specific rate of flow.

Another object of this invention is to overcome this drawback by combining a rotary blade ring of the above kind with a counter-rotating preliminary stage of a particular type, having both a high specific rate of flow and other characteristics which allow a satisfactory compression ratio.

In accordance with the invention, this upstream stage of the compressor is formed by counter-rotating blade ring operating in the transonic range, i.e. in the range of relative air speeds within which both subsonic and supersonic relative speeds are present in the field of flow around the blades. Thus for instance, the Mach number of the relative flow may be comprised between 0.7 and 1.2 at the hub or blade roots and between 1.2 and 1.6 at the blade tips.

Thus, the main motive bladed wheel rectifies the counter-rotational flow generated by the upstream transonic stage. This wheel is designed to operate at a relative speed of flow which is entirely supersonic, and therefore there is no formation, in the passages between the blades, of shock waves of the kind which produces a subsonic flow on the downstream side.

Another object of the present invention is to avoid the use of stationary intermediate guide-vanes between the two oppositely-rotating wheels.

Still another object of this invention is to modify the flow conditions downstream of the counter-rotating wheels, so as to obtain a spinning flow with the formation therein of an oblique shock wave of the so-called "second" type, that is to say an oblique shock wave which generates a subsonic flow on its downstream side (contrary to oblique shock waves of the so-called "first" type, which do not affect the supersonic nature of the flow).

In accordance with the present invention, a two-stage compressor with a high specific rate of flow and a high compression ratio, comprises two counter-rotating stages: a first transonic stage and a second supersonic stage, the latter operating throughout with a supersonic relative speed of flow and discharging an absolute supersonic flow which is axial or spinning. The conversion of kinetic energy into pressure takes place in an annular space extending on the downstream side of the second stage:

(1) Either by means of a single annular and planar shock wave, perpendicular to the axis of the machine, which constitutes a frontal shock wave in the case of a purely axial flow, or an oblique shock wave of the "second" type in the case of a spinning flow;

(2) Or by means of a preliminary supersonic compression system and a final transonic shock wave.

A compressor of this kind can be conveniently used in a turbo-jet unit or a turbo-prop unit; in this case, it will be driven by the gas turbine of the unit.

Figure 1:
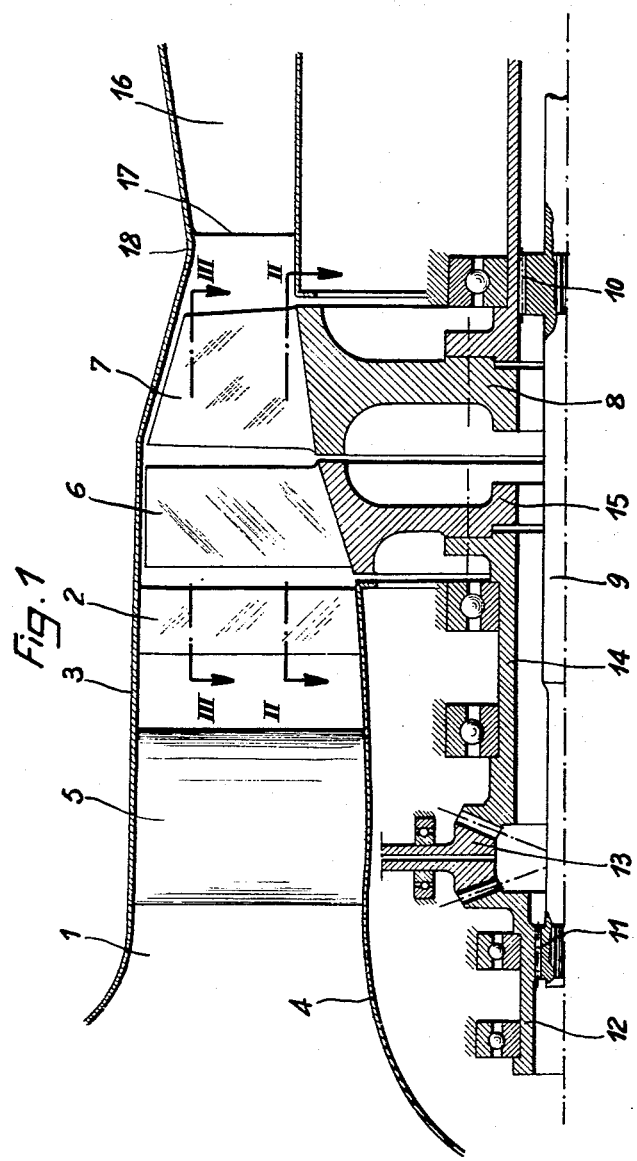
Figure 1 is an axial diagrammatic longitudinal section of a supersonic compressor in accordance with the invention.
Figure 2:
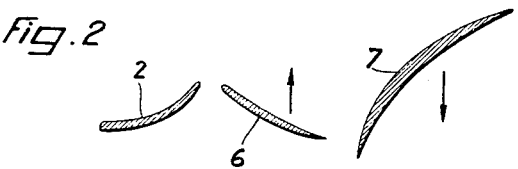
Figures 2 and 3 are cross-sections of the successive blades, taken along the lines II—II and III—III of Figure 1.
Figure 3:
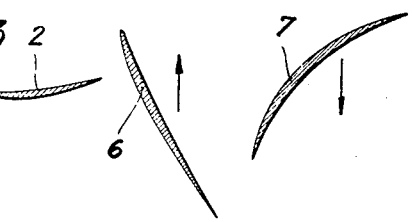

The compressor shown in Figures 1 to 3 comprises an air-intake duct 1 which ends with a stationary ring of guide-vanes 2. The latter are fast with the casing 3 of the compressor and with a central body 4 supported by means of radial struts 5.

The ring of guide-vanes 2 is followed by two moving rings of blades 6 and 7, rotating in opposite directions and driven in any suitable manner. Figure 1 shows a conventional transmission gear for producing opposite rotations.

In the illustrated example, the hub 8 of the wheel 7 meshes with a shaft 9, through teeth 10; further teeth 11 on this shaft mesh with an intermediate shaft 12 which is geared, through a pinion 13, with a hollow shaft 14 fast with the hub 15 of the rotary bladed wheel 6. Thus, the wheel 6 is rotated at the same speed as the wheel 7, but in opposite direction, as shown by the arrows on Figures 2 and 3.

It would, of course, be possible to use instead a turbine with two stages rotating in opposite directions and coupled directly to the wheels 6 and 7 respectively.

The blade system 7 is so designed as to have throughout its entire radial height a relative flow at supersonic velocity and to discharge this flow with an absolute velocity which may be purely axial or at an angle with the axis, but which has in any case a supersonic axial component.

The portion of the compressor on the downstream side of the blades 7 is formed by an annular passage 16 which is free of any blade or vane and forms a supersonic diffuser adapted to produce a shock wave 17 just downstream of the neck 18 of the diffuser, or in a border-line case at the neck itself.

This diffuser may be provided with a boundary layer control device acting for example by suction through one or more slots formed in the walls of the diffuser, or through porous walls of this diffuser.

The upstream bladed wheel 6 is so designed as to have a relative flow in the transonic range, that is to say, subsonic at the hub and supersonic at the periphery. It has a low diametral ratio (ratio of the internal diameter of the blades to the external diameter) provides a large rate of flow. Owing to the standard conditions of flow at the internal radius of this wheel, its compression ratio will not substantially exceed that of a conventional axial stage. As a result, however, of the arrangement on its downstream side of an oppositely rotating supersonic stage 7, the latter operates on a flow having a high peripheral component and whose kinetic moment is composed of kinetic moments of same sign resulting from the positive pre-rotation generated by the upstream guide-vanes 2, and from the motive work of the transonic ring of blades. It will be observed that the outlines of the casing surrounding the blades 6 and 7 and of the hubs in which these blades are rooted converge towards the diffuser.

Figure 4:
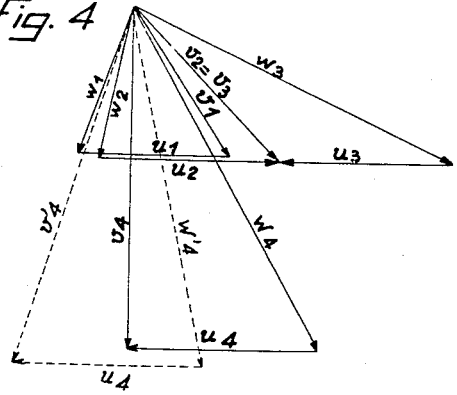
Figure 4 shows the velocity diagram at the hub of the compressor.
Figure 5:
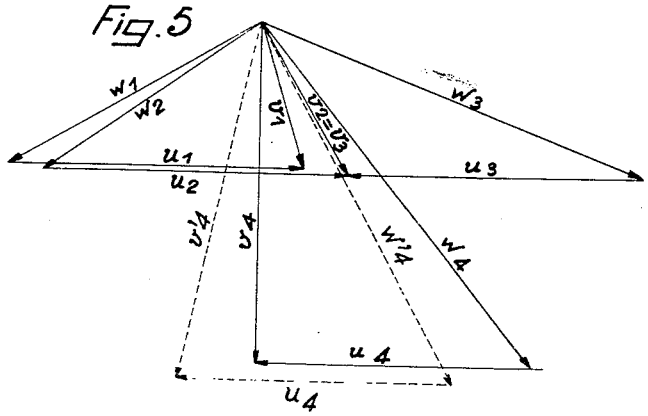
Figure 5 is a similar diagram applicable to the periphery.

Figures 4 and 5 show the velocity diagrams which correspond respectively to the hub and to the periphery of the blades 6 and 7. In these diagrams, the letters $u$, $v$, $w$ stand, respectively, for the tangential velocity of the rotor at a given radius, the absolute velocity of the fluid at this level, and its relative velocity with respect to the moving blades. The indices 1, 2, 3 and 4 associated with these letters correspond respectively to the input of the transonic blades 6, the output of the latter, the input of the supersonic blades 7, and their output.

By way of example and in order clearly to illustrate the running of a compressor in accordance with the invention, the following table gives the approximate values of the speeds in meters per second.

Speeds at the hub (Fig. 4):

| | | |
|---|---|---|
| $u_1=225$ | $v_1=264$ | $w_1=230$ |
| $u_2=266$ | $v_2=314$ | $w_2=224$ |
| $u_3=266$ | $v_3=314$ | $w_3=536$ |
| $u_4=287$ | $v_4=505$ | $w_4=580$ |

Speeds at the periphery (Fig. 5):

| | | |
|---|---|---|
| $u_1=450$ | $v_1=230$ | $w_1=433$ |
| $u_2=450$ | $v_2=257$ | $w_2=387$ |
| $u_3=450$ | $v_3=257$ | $w_3=622$ |
| $u_4=407$ | $v_4=505$ | $w_4=648$ |

It can be seen that, in this example, there is obtained at the outlet of the main stage 7, both at the hub and at the periphery, a supersonic flow having a purely axial direction, with a uniform speed of 505 meters per sec., which corresponds to a Mach number of 1.6.

The blades 7 could be designed so that the relative outlet velocity $w'_4$ gives an absolute velocity $v'_4$ which is at an angle with the axis as indicated in dotted lines in Figs. 4 and 5. In this case, the work of compression is increased by the product of $u_4$ and the projection of $v'_4$ on $u_4$.

There will then be produced an oblique shock wave of the "second" type in the diffuser 16, and it will be necessary to provide a rectifier ring of blades at the outlet of this diffuser.

What is claimed is:

1. An axial-flow air compressor comprising, in succession and in series flow arrangement, a ring of blades having, toward the root thereof, an aerofoil section suitable to subsonic flow conditions and toward the tip thereof, an aerofoil section suitable to supersonic flow conditions, said ring being designed to rotate at a speed such that the relative airflow velocity therethrough is subsonic near the inner periphery and supersonic near the outer periphery, a further ring of blades having, from the root to the tip thereof, an aerofoil section suitable to supersonic flow conditions, said further ring being designed to rotate in the direction opposite to that of the former ring, at a speed such that the relative airflow velocity therethrough is supersonic throughout and the axial component of the absolute airflow velocity at its discharge end is also supersonic, and an annular vaneless diffuser collecting the supersonic discharge flow from said further ring and having a design suitable to the formation therein of a shock wave converting the supersonic flow into a subsonic flow.

2. Air compressor as claimed in claim 1, wherein the blade shape and design speed of the further ring are such that the discharge flow therefrom is parallel to the axis of the compressor, the shock wave formed in the diffuser being then of the frontal type.

3. Air compressor as claimed in claim 1, wherein the blade shape and design speed of the further ring are such that the discharge flow therefrom is at an angle with the axis of the compressor, the shock wave formed in the diffuser being then of the "second" oblique type.

4. An axial-flow air compressor comprising a supersonic rotary stage, a transonic stage upstream of said supersonic stage and driven in the opposite direction, and a vaneless supersonic diffuser downstream of said supersonic stage.

References Cited in the file of this patent

UNITED STATES PATENTS

| 2,579,049 | Price | Dec. 18, 1951 |

FOREIGN PATENTS

| 671,418 | Germany | Feb. 7, 1939 |
| 724,553 | Germany | Aug. 29, 1942 |